March 21, 1933.   F. G. LILJENROTH   1,902,652
METHOD OF PRODUCING MIXED FERTILIZERS
Filed Dec. 10, 1927   2 Sheets-Sheet 1
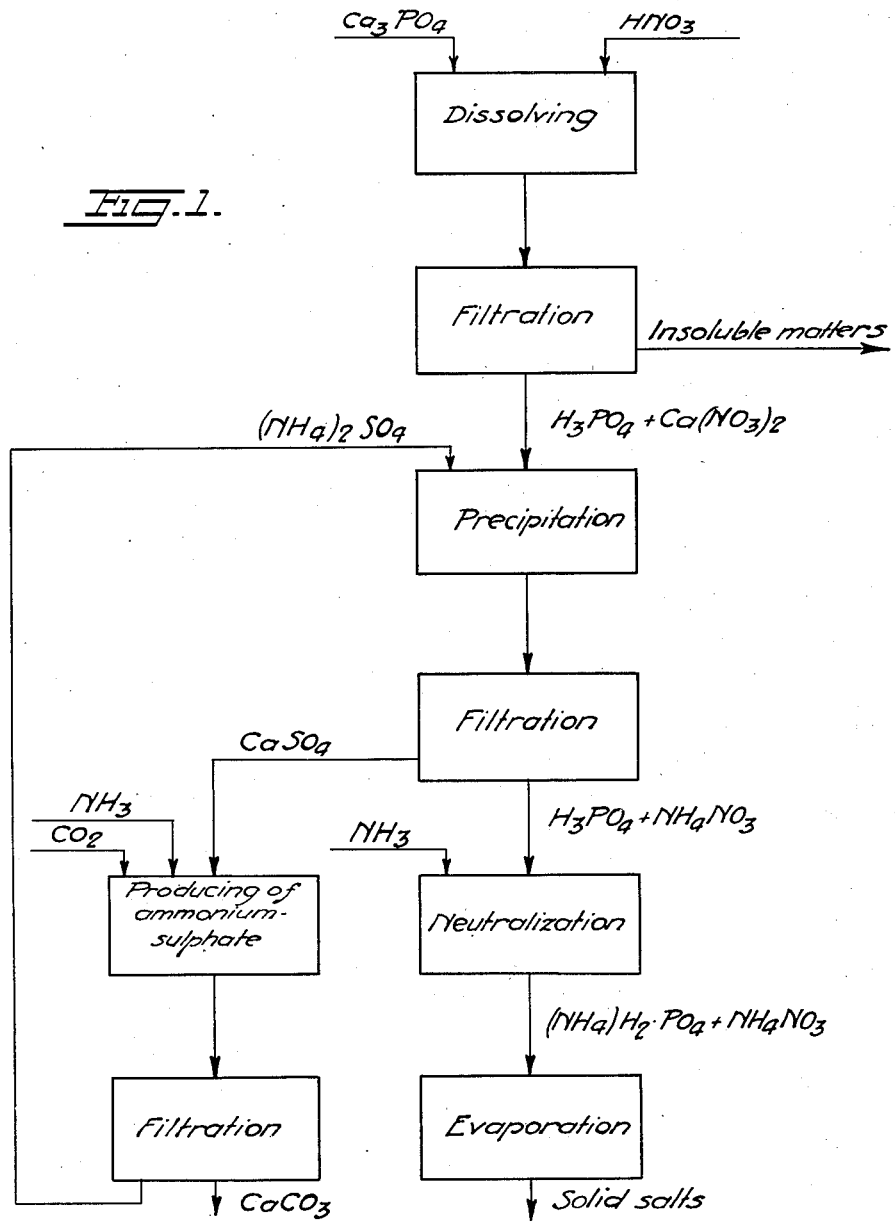

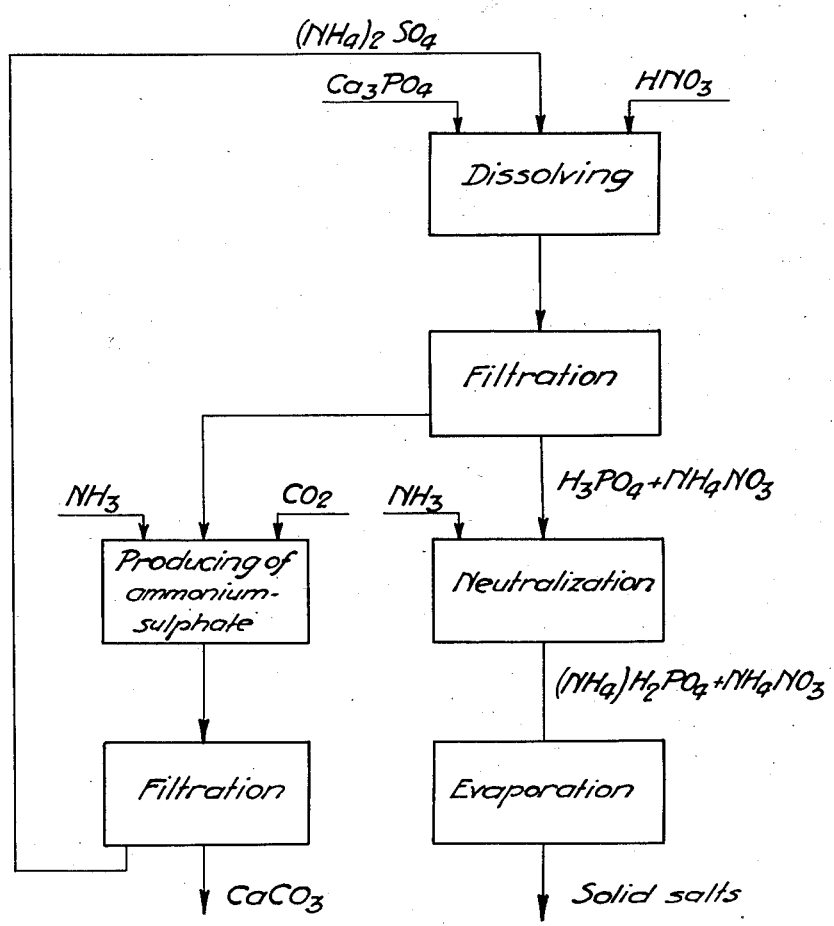

Patented Mar. 21, 1933

1,902,652

UNITED STATES PATENT OFFICE

FRANS GEORG LILJENROTH, OF STOCKHOLM, SWEDEN

METHOD OF PRODUCING MIXED FERTILIZERS

Application filed December 10, 1927, Serial No. 239,259, and in Sweden December 14, 1926.

It has already been proposed to produce mixed fertilizers by leaching crude calcium phosphate by means of nitric acid thus producing a solution of calcium nitrate and monocalcium phosphate according to the formula:

$$Ca_3(PO_4)_2 + 4HNO_3 = 2Ca(NO_3)_2 + CaH_4(PO_4)_2$$

and then precipitating the lime as calcium sulphate by an addition of ammonium sulphate, the object being to obtain a mixture of ammonium nitrate and ammonium phosphate after the removal of the calcium sulphate and the evaporation of the solution.

In trying said method I have found that it does not produce the result aimed at. It was found that the leaching does not take place according to the formula above referred to but rather according to the formula:

$$Ca_3(PO_4)_2 + 6HNO_3 = 3Ca(NO_3)_2 + 2H_3PO_4$$

or in any case in such manner that always a considerable percentage of free phosphoric acid is obtained in the solution. If a sufficient quantity of ammonium sulphate is added to this solution the lime is completely precipitated as calcium sulphate and a solution containing ammonium nitrate and free phosphoric acid is obtained. In evaporating said solution to dryness the ammonium nitrate is decomposed and considerable losses of nitrogen arise.

This invention relates to a method of producing mixed fertilizers by leaching crude calcium phosphate by means of an acid the calcium salt of which is soluble which method can be technically carried out and makes it possible to produce mixed fertilizers having high percentages of active components. The invention consists, chiefly, in this that the crude phosphate is leached with the acid so that a solution containing calcium salts and free phosphoric acid is obtained, whereupon the lime is precipitated from this solution by means of one or more soluble sulphates while the solution is maintained acid, the precipitate being then removed and the solution neutralized and evaporated.

The acids which can be used according to this invention are nitric acid, hydrochloric acid or any other acid which can dissolve crude phosphate and the calcium salt of which is soluble. The acid should be used in such quantity that the phosphoric acid is completely or essentially transferred into the solution which also contains the soluble calcium salt of the acid used. The solution is, preferably, separated from the insoluble residues before the lime is precipitated. For said precipitation ammonium sulphate, potassium sulphate, sodium sulphate, potassium bisulphate, sodium bisulphate, and so on, can be used. It is not needed to add more sulphate than is necessary completely to precipitate the lime, but there is no objection to adding more in which case the excess is present in an unaltered state in the end product. The lime is precipitated as calcium sulphate and the solution contains, if nitric acid was used for the leaching operation and ammonium sulphate for the precipitation, essentially ammonium nitrate and free phosphoric acid. Such solution, containing free phosphoric acid cannot as above mentioned be evaporated without losses of nitrogen but must first be neutralized by means of a base which together with phosphoric acid forms a soluble salt, ammonia being for such purpose the most suitable base. The neutralizing agent cannot, however, be added as long as the calcium sulphate is present, as ammonium phosphate in a neutral or basic solution immediately reacts with the calcium sulphate to form ammonium sulphate while insoluble calcium phosphate is precipitated. It is, therefore, necessary to remove the calcium sulphate from the acid solution and only after such removal add ammonia or some other suitable neutralizing agent until the solution becomes neutral whereupon the solution finally is evaporated, the result being a mixed salt consisting in the example given of ammonium nitrate and ammonium phosphate, mono-ammonium or di-ammonium phosphate according to the quantity of ammonia added. In this manner an end product can be obtained containing about 20% of $P_2O_5$ and 24 to 28% of $N_2$.

When a mixed fertilizer containing also potash is to be produced in this manner the above-mentioned evaporated product can be mixed with a potassiferous material or the potassiferous material may be added to the solution before the evaporation or, if desired, previously to the leaching liquor. If, for instance, potassium chloride is added in a suitable quantity it is possible to produce in this manner a mixed fertilizer containing for instance about 17% of $N_2$, 13% of $P_2O_5$ and 21% of $K_2O$.

When potassium sulphate is used for the ammonium sulphate to precipitate the lime, mixed salts are obtained which besides phosphoric acid and nitrogen also contain potash. If the lime is completely precipitated by means of potassium sulphate it is possible to obtain a product containing for instance about 34% of $K_2O$ and, moreover, about 17% of $P_2O_5$ and about 10% of $N_2$. By using partly ammonium sulphate and partly potassium sulphate it is possible to reduce at will the percentage of potash and simultaneously increase in a corresponding degree the percentage of nitrogen and phosphoric acid. In this manner the percentages of the three elements necessary for the plants in the end product can be varied within wide limits. If a rather high percentage of phosphoric acid is desired in the end product sulphuric acid or bisulphate may be substituted for a part of the leaching acid. If on the other hand a rather high percentage of nitrogen is desired, more nitric acid than is required for the dissolving of the lime may be added or the lime may be partly precipitated by means of sulphuric acid or bisulphate, or more ammonium sulphate than is required for the complete precipitation of the lime may be added. If on the other hand it is desirable to increase the percentage of potash an excess of potassium sulphate may be added.

It is not necessary to add the precipitating agent after the leaching operation as above described in as much as said agent or a part thereof may be added directly in the leaching operation, the lime being thus precipitated from the soluble calcium salt by means of the added precipitating agent as said salt is formed, the combined leaching and precipitating operations thus resulting in a solution free from lime or a solution containing a less percentage of lime than the crude phosphate treated.

It is not necessary to use the leaching acid in a quantity that is equivalent to the lime of the crude phosphate, it being on the contrary possible in leaching with the leaching acid alone to work with a deficit of acid up to 15 to 20% and, notwithstanding, practically completely dissolve the soluble lime—the greater part as the calcium salt of the leaching acid and the remainder i. e. the excess above the leaching acid as monocalcium phosphate. The solution resulting from the leaching operation contains thus in this case: the calcium salt of the leaching acid, monocalcium phosphate and free phosphoric acid. The operation is then performed as above described i. e. the lime is precipitated by an addition of a sulphate, for instance ammonium sulphate, the precipitated calcium sulphate is removed, the solution is neutralized, for instance with ammonia, and finally evaporated.

When the precipitating agent, for instance ammonium sulphate, is used together with the leaching acid it is possible to work with an essentially larger (viz. about 25 to 30% instead of about 15 to 20%) deficit of leaching acid in comparison with the case that the precipitating agent is added after the leaching. This circumstance depends thereon that the lime when the precipitating agent is used together with the leaching agent is directly converted to calcium sulphate so that a soluiton free from lime and containing the ammonium salt of the leaching acid, mono-ammonium phosphate and free phosphoric acid and possibly an unconsumed portion of the precipitating agent is directly obtained instead of a solution containing the calcium salt of the leaching acid, mono-calcium phosphate and free phosphoric acid as is the case when the precipitating agent is not used together with the leaching acid.

In order to prevent the mono-ammonium phosphate in a solution of the first-mentioned kind from reacting with the calcium sulphate so as to form insoluble calcium phosphate a considerably less acidity i. e. a less quantity of free phosphoric acid is required than is the case when the precipitation of insoluble calcium phosphate from a solution of the last-mentioned kind is to be prevented. On account of this fact it is possible in the first-mentioned case to reduce the quantity of leaching acid to such an extent that a solution is obtained in which the phosphoric acid is practically completely combined with ammonia to mono-ammonium phosphate and only a small portion is present as free phosphoric acid, so that the solution after the removal of the calcium sulphate precipitate does not require any or only a small addition of the neutralizing agent. In the latter case, on the contrary, it would not be possible to reduce the quantity of leaching acid further or to have a higher percentage of mono-calcium phosphate in the solution than one such that about half of the phosphoric acid will be present in the solution in free form.

When ammonium sulphate is used for the precipitation of the lime it is preferably regenerated by converting a corresponding quantity of the precipitated calcium sulphate with ammonia and carbon dioxide into ammonium sulphate, a precipitate of calcium carbonate being simultaneously obtained. The carbon dioxide required for said conversion is preferably produced from the precipitated calcium carbonate obtained in the process either by heating or by treating it with an acid, as for instance hydrochloric acid or nitric acid in which latter case also calcium nitrate is obtained.

When potassium sulphate or potassium bisulphate is used for the precipitation of the lime said salt is, preferably, produced by treating a raw material containing potassium chloride with sulphuric acid which is recovered by heating a corresponding quantity of the precipitated calcium sulphate under suitable conditions so that sulphurous acid is set free which latter is converted into sulphuric acid in well-known manner. When sodium sulphate or sodium bisulphate is used it is, preferably, produced in an analogous manner from sodium chloride. Simultaneously and in the same manner as the sulphuric acid required for the producing of the alkali sulphate is regenerated also the sulphuric acid which eventually has been used in the leaching or precipitating process as free acid is regenerated. The hydrochloric acid obtained as a by-product in treating the potassium or sodium chloride with sulphuric acid can, if desired, be used for the regeneration of the carbon dioxide from the calcium carbonate precipitated in producing the ammonium sulphate.

In the accompanying drawings I have illustrated in Figs. 1 and 2 diagrammatically the performance of the invention when using nitric acid as dissolving agent for the phosphate rock and ammonium sulphate as precipitant for the lime.

In Fig. 1 phosphate rock is dissolved in weak nitric acid and the insoluble matters are separated by filtration. To the clear solution of phosphoric acid and calcium nitrate ammonium sulphate is added in another compartment to precipitate the lime as calcium sulphate. The calcium sulphate separated is then converted by means of ammonia and carbon dioxide into ammonium sulphate and calcium carbonate which latter is removed while the ammonium sulphate solution is used in the process as precipitant for the lime dissolved. The clear solution of phosphoric acid and ammonium nitrate obtained in filtering off the calcium sulphate is neutralized with ammonia whereupon the solution is evaporated, the resulting product being a mixture of ammonium phosphate and ammonium nitrate in solid state.

According to Fig. 2 the phosphate rock is dissolved in a mixture of nitric acid and ammonium sulphate. The solution of phosphoric acid and ammonium nitrate obtained is separated from the calcium sulphate and other insoluble residues whereupon the calcium sulphate is converted by means of ammonia and carbon dioxide into calcium carbonate and a solution of ammonium sulphate. Said solution of ammonium sulphate is used as addition to the nitric acid in the continued performance of the process. In other respects the process is performed in the same manner as was described in connection with Fig. 1.

The ammonium sulphate solution can be produced with a strength of about 40% and its addition to the nitric acid renders it unnecessary to dilute the nitric acid with water and facilitates further the separation of the calcium sulphate precipitate and other insoluble residues and the recovery of adhering valuable solution with a minimum of washing water, whereby the evaporation work is reduced.

What I claim is:—

1. Method of producing mixed fertilizers, which comprises leaching crude calcium phosphate with a solution containing a sulphate the base of which forms a soluble salt with phosphoric acid and an acid the calcium salt of which is soluble, said acid being present in deficit in relation to the content of lime in the crude phosphate, separating the insoluble matters from the solution, neutralizing the latter, and finally recovering the soluble salts from the neutralized solution by evaporation.

2. Method of producing mixed fertilizers, which comprises leaching crude calcium phosphate with a solution containing a sulphate the base of which forms a soluble salt with phosphoric acid, and an acid the calcium salt of which is soluble, said acid being present in a quantity corresponding to about 75% of the content of lime in the crude phosphate and the sulphate being present at least in equivalent quantity in relation to said lime, separating the insoluble matters from the solution obtained, neutralizing the latter, and finally recovering the salts from the neutralized solution by evaporation.

3. Method of producing mixed fertilizers, which comprises leaching crude calcium phosphate with a solution containing ammonium sulphate and an acid the calcium salt of which is soluble, said acid being present in deficit in relation to the content of lime in the crude phosphate, separating the insoluble matters from the solution, neutralizing the latter, and finally recovering the soluble salts from the neutralized solution by evaporation.

4. Method of producing mixed fertilizers, which comprises leaching crude calcium phosphate with a solution containing ammonium sulphate and nitric acid, the latter being present in deficit in relation to the content of lime in the crude phosphate, separating the insoluble matters from the solution, neutralizing the latter, and finally recovering the soluble salts from the neutralized solution by evaporation.

5. Method of producing mixed fertilizers, which comprises leaching crude calcium phosphate with a solution containing ammonium sulphate and nitric acid, said acid being present in deficit in relation to the content of lime in the crude phosphate, separating the insoluble matters from the acid solution obtained, treating said matters with ammonia and carbon dioxide so as to produce a solution of ammonium sulphate and a precipitate of calcium carbonate, utilizing said solution of ammonium sulphate in mixture with nitric acid in continuing the process, neutralizing the solution obtained in the leaching operation, and finally recovering the soluble salts from the neutralized solution.

In testimony whereof I have signed my name.

FRANS GEORG LILJENROTH.